April 12, 1927.  S. M. RANSOME  1,624,676
NUT AND SCREW FEED
Filed May 21, 1925  2 Sheets-Sheet 1

Inventor
Stafford M. Ransome,
By Churchill Parker Carlson
Attys

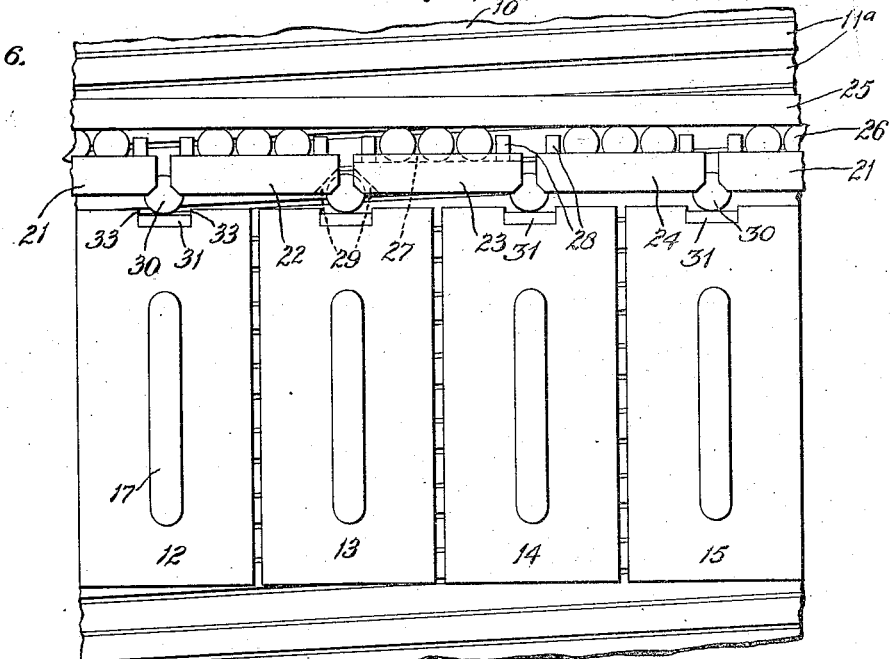
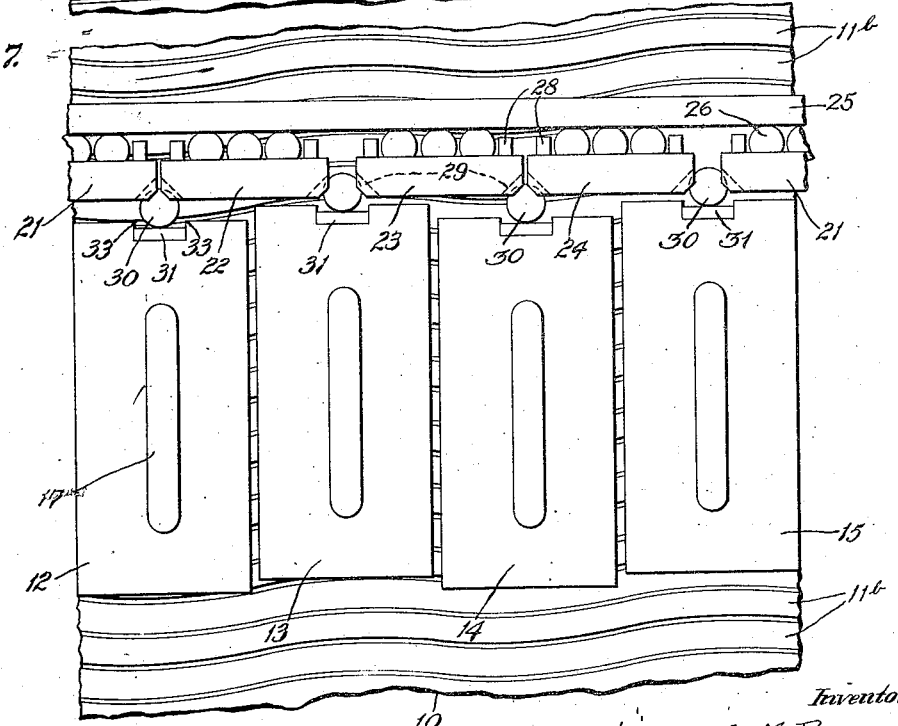

Patented Apr. 12, 1927.

1,624,676

UNITED STATES PATENT OFFICE.

STAFFORD M. RANSOME, OF ROCKFORD, ILLINOIS, ASSIGNOR TO BARBER-COLMAN COMPANY, OF ROCKFORD, ILLINOIS, A CORPORATION OF ILLINOIS.

NUT AND SCREW FEED.

Application filed May 21, 1925. Serial No. 31,963.

This invention relates generally to screw feeds, and in particular to means for compensating for inaccuracies in the thread of a feed screw.

Heretofore in machine tools having parts fed by a screw acting on a nut, the accuracy of the work done by the machine has been dependent upon the accuracy of the screw feed. For some work inaccuracies of the screw may be compounded by producing inaccurate tools which are used to produce other tools or parts. Therefore, it is quite essential, in order to secure the greatest degree of accuracy, to use accurate feed screws or to use means to compensate for possible inaccuracies of the feed screw. A common defect of feed screws is a variation in the rate of advance of the helical thread, which leads to the so-called "drunkenness" of the feed.

The primary object of this invention is to provide a simple compensating device for correcting the drunkenness of feed screws.

Another object of the invention is to provide a plurality of parts acted upon by the feed screw and to provide a mechanism associated with said parts to average the advance of said parts and to impart the averaged advances to some portion of the machine which is to be fed by the screw.

Still another object of the invention is to provide a compound nut comprised of a plurality of sections moved by different portions of the feed screw and to provide mechanism to combine the motions of the various sections into a single motion imparted to another element.

Still other and ancillary objects and advantages of the present invention will be apparent from the following description of an exemplary embodiment of the invention as shown in the accompanying drawings, in which—

Fig. 6 is a rectified projection in elevation of the correcting nut and of the feed screw, the thread of the screw being indicated as a perfect helix.

Fig. 7 is a view similar to Fig. 6 showing an inaccurate helical thread on the feed screw.

Figure 2:
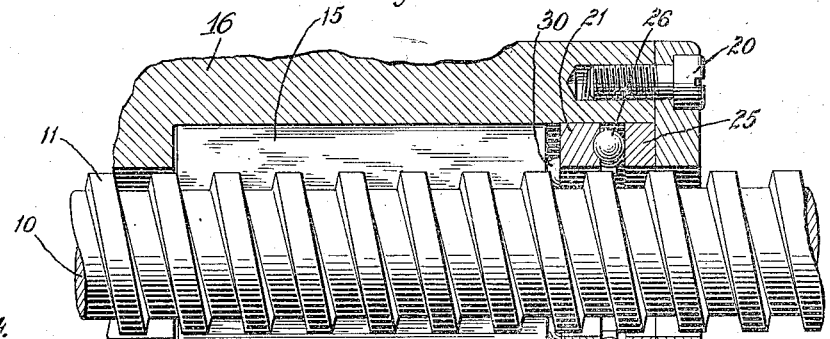
Fig. 2 is a cross-sectional view taken substantially on the line 2—2 of Fig. 5.
Figure 4:
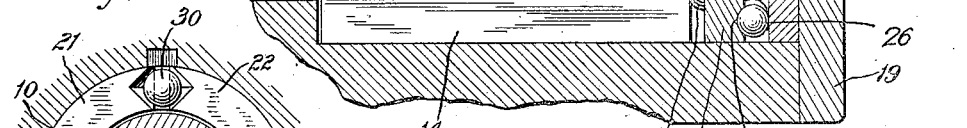
Fig. 4 is a cross-sectional view on the line 4—4 of Fig. 1 showing the other end of the averaging mechanism.
Figure 1:
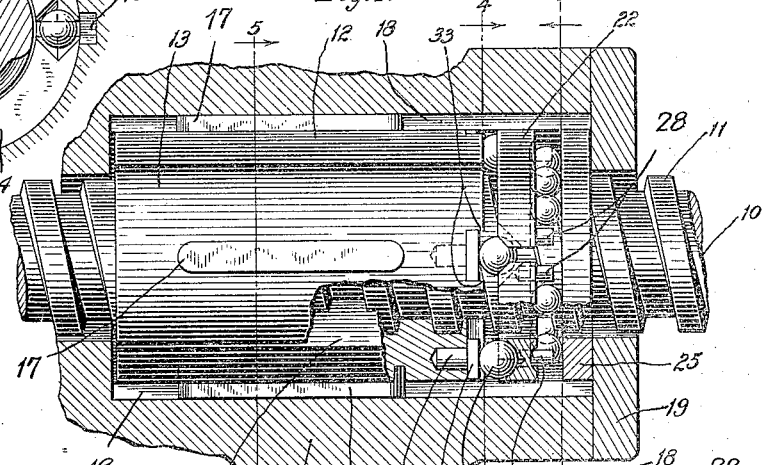
Fig. 1 is a cross-sectional view showing the correcting mechanism partly in elevation.
Figure 5:
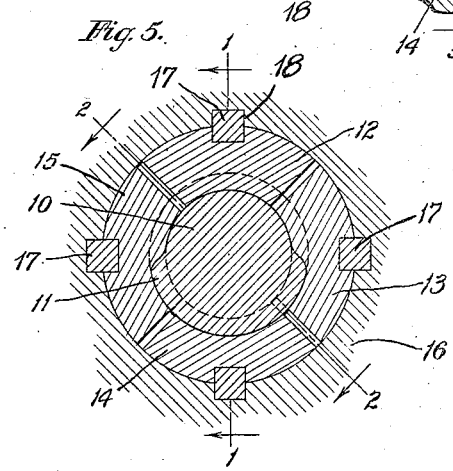
Fig. 5 is a cross-sectional view on the line 5—5 of Fig. 1 showing the arrangement of the nut segments.
Figure 3:
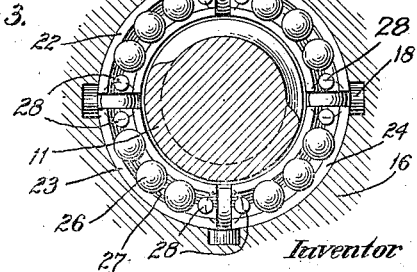
Fig. 3 is a cross-sectional view taken on the line 3—3 of Fig. 1, showing an end view of the averaging mechanism.

In the following description of the device illustrated in the drawings, the particular embodiment of the invention is not to be construed as a limitation of the invention to the construction shown. It will be apparent, in view of the following explanation of the invention, that alternative constructions and arrangements of the parts are herein contemplated by the invention as expressed in the appended claims.

Referring particularly to the drawings, I show a feed screw 10, such as is commonly used to move carriages in lathes, hobbing machines, and other machine tools. The feed screw has thereon a helical thread 11. When the thread is a perfect helix, a plane development thereof may be represented by a series of straight lines, as in Fig. 6. When, however, certain portions of the thread advance more rapidly than others, a plane development thereof would be represented by a series of wavy lines, as in Fig. 7.

Means is provided between the screw and the machine part fed thereby to advance such machine part relatively along the feed screw by the rotation of one of the members, said means serving to compensate for irregularities in the helix of the feed screw. In the present instance, this is effected by means in the form of a plurality of members fed by different portions of the feed screw, as, for example, a nut composed of sections which are so related that the independent action of the screw on each section is transmitted to an intermediate element. The motion of the intermediate element is thus made to be the average motion of the various sections. It is preferable that the sections used be arcuate segments circumferentially placed about the screw so that they form in effect a single nut.

In the present instance, such a nut is composed of four arcuate segments 12, 13, 14 and 15, each being substantially a quarter section of a nut. Means is employed to hold the segments circumferentially rigid yet capable of longitudinal motion relative to each other. Such means may consist of a casing or container, in the present instance this being a cylindrical casing 16, in which the segments are held to permit longitudinal motion by suitable guiding means. Such means is shown in the form of a key 17, disposed between the segments and the container, the key being fixed in one part and movable in a key-way in another part, such as the key ways 18 herein shown in the container 16.

In the rotation of an arcuate feed screw, the segments forming the nut are equally advanced simultaneously. When inaccuracies such as those of the thread 11$^b$ are present in the helical thread, some segments will be advanced slightly more than the required amount, some may be correctly advanced, and others will be slightly retarded, the average of the advance of all the segments corresponding substantially to the advance which would result from a true helix 11$^a$. Accordingly, the invention includes means to average the advances of the segments and to transmit the average advance to a carriage or other element to be moved by the screw. In the present instance, the element to be advanced is the container 16. A ring cap 19 is placed over the end of the container 16, the cap being suitably secured thereto as by the screw 20. The ring 19 passes freely over the screw 10 and serves to take the thrust of the nut segments, the averaging mechanism being interposed between this ring and the segments.

The averaging mechanism comprises, in the present instance, a segmental ring corresponding preferably in number of segments to the segments of the nut, in the present instance four, the ring segments being herein designated as 21, 22, 23 and 24. Unlike the nut, the ring has its segments fixed against longitudinal motion axially of the ring relatively to each other, and further has its segments free for relative circumferential motion in the plane of the ring about its axis. In order to limit the longitudinal motion of the ring segments, a fixed ring 25 is employed in abutting relation to the ring cap 19. A plurality of bearing balls 26 are placed between the thrust bearing ring 25 and the segmental ring. One side of the ring segments is preferably grooved as at 27 to receive the balls 26. Retaining means such as the pins 28 are associated with each segment to retain a predetermined number of the balls 26 always stationed in the race 27 of each segment. In the present construction three balls are so retained.

To equalize or average the thrust of the nut segments against the ring segments I employ wedging means between the ring segments, the wedging means being acted upon by the nut segments. In the present instance the wedging means is provided by forming each end of each ring segment with doubly beveled notches 29 on the side adjacent the nut segments, the adjacent bevels 29 forming a V-shaped or pyramidal recess between adjacent segments which can be widened by a separating motion of the adjacent ring segments. The advance of the single nut segment is made effective at the beveled ends 29 to cause the separation of the ring segments, and for this purpose there is employed a single ball 30 acting on the two opposing notches 29 by the advance of one of the nut segments. The ball 30 is preferably placed at the center of the nut segment. A hardened piece of steel 31 may be suitably mounted in the end of the nut segment where the ball 30 bears thereon, the hardened piece being held in position by means such as a pin 32 whereby the piece is readily removable. The bearing piece 31 is preferably set below the level of the end of the nut segment in a suitable recess, thereby forming shoulders 33 which serve to keep the ball 30 stationed substantially always at the center of the nut segment.

In the operation of a machine embodying this invention, let it be supposed that the helical feed screw 10 has an irregular thread helix, as shown in Fig. 7. It is obvious that the ordinary nut, commonly found in machines of this character, would be advanced non-uniformly by a uniform rotation of the feed screw. However, by providing the machine with a nut embodying the present invention, the inaccuracies are smoothed out and are averaged towards a uniform advance of the compound nut, the accuracy of the averaging, of course, being dependent upon the number of segments forming the nut. By reference to Fig. 7, representing a thread of the feed screw and a plurality of segments in rectified projected elevation, it is obvious that rotation of the feed screw will cause the nut segments 12, 13, 14 and 15 to be out of line, as shown, compared to their position in Fig. 6 wherein a true helix 11$^a$ is shown. In Fig. 7, the segments 13 and 15 are shown advanced beyond the positions occupied by segments 12 and 14. The advanced segments 13 and 15 are shown to have forced the balls 30 forward against the beveled ends 29 of the ring segments, the ball 30 of the nut segment 13 having caused a separation of the ring segments 22 and 23. At the same time, the backward position of the segments 12 and 14 permits the balls 30 bearing thereon to withdraw from the ring segments, thus permitting the adjacent ring segments to approach each other as they are separated from the opposite ends by the advanced nut segments. It is clear that as the relative positions of the nut segments are reversed from that shown in Fig. 7, the ring segments likewise move into a different position, thus serving to cause an averaging effect of the longitudinal motion of the nut segments. The averaged motion is then imparted through the balls 26 to the ring 25 and thence to the ring cap 19, which in the present instance is secured to the container 16, thus causing it to advance with the segments contained therein, the whole forming a compact correcting device of great simplicity.

I claim as my invention:

1. A nut and screw feed device comprising, in combination, a feed screw, a plurality of nut segments circumferentially arranged about the screw in non-rotational relation with respect to each other, each of said segments being independently movable axially of the screw, a plurality of ring segments arranged circumferentially about the feed screw, said ring segments being held against motion relative to each other axially of the feed screw and being free for circumferential motion with respect to each other about the feed screw, there being at least as many ring segments as nut segments, and means associated with each nut segment to separate two adjacent ring segments by an advance of a nut segment.

2. A nut and screw feed device comprising, in combination, a feed screw, a plurality of nut segments circumferentially arranged about the screw in non-rotational relation with respect to each other, each of said segments being independently movable axially of the screw, a plurality of ring segments arranged circumferentially about the feed screw, said ring segments being held against motion relative to each other axially of the feed screw and being free for circumferential motion with respect to each other about the feed screw, there being at least as many ring segments as nut segments, each of said ring segments having beveled ends forming a V-notch opening towards the nut segments, and a ball in said V-notch in engagement with the end of a nut segment.

3. A nut and screw feed device comprising, in combination, a feed screw, a plurality of circumferentially arranged nut segments and a similar number of circumferentially arranged ring segments about the screw, the nut segments being axially movable and circumferentially immovable with respect to each other, the ring segments being circumferentially movable and axially fixed with respect to each other, and means disposed between the nut segments and the ring segments to effect circumferential motion of the ring segments by unequal longitudinal motion of the nut segments.

4. A nut and screw feed device comprising, in combination, a feed screw, a plurality of circumferentially arranged nut segments, a similar number of circumferentially arranged ring segments about the screw, the nut segments being axially movable and circumferentially immovable with respect to each other, the ring segments being circumferentially movable and axially fixed with respect to each other, means disposed between the nut segments and the ring segments to effect circumferential motion of the ring segments by unequal longitudinal motion of the nut segments, and means held in abutting relation to the ring segments in the plane thereof to be moved thereby in the general advance of the nut segments by the screw.

5. A nut and screw feed device comprising, in combination, a feed screw, a plurality of circumferentially arranged nut segments, a similar number of circumferentially arranged ring segments about the screw, the nut segments being axially movable and circumferentially immovable with respect to each other, the ring segments being circumferentially movable and axially fixed with respect to each other, means disposed between the nut segments and the ring segments to effect circumferential motion of the ring segments by unequal longitudinal motion of the nut segments, an annular member about said screw, and a plurality of bearing balls disposed between said segments and said annular member.

6. A nut and screw feed device comprising, in combination, a feed screw, a plurality of circumferentially arranged nut segments, a similar number of circumferentially arranged ring segments about the screw, the nut segments being axially movable and circumferentially immovable with respect to each other, the ring segments being circumferentially movable and axially fixed with respect to each other, means disposed between the nut segments and the ring segments to effect circumferential motion of the ring segments by unequal longitudinal motion of the nut segments, each ring segment having a ball race formed upon the outer side thereof, a plurality of balls in said race, retaining means for said balls, and an annular member about the screw forming a bearing surface for said balls, said member serving to receive the thrust of the advancing nut segments.

7. A nut and screw feeding device comprising in combination, a feed screw, a casing surrounding said screw, said casing being freely slidable along the feed screw, a plurality of nut segments in said casing held non-rotatably therein and freely slidable along the direction of the screw, an annular cap over one end of the casing rigidly secured thereto, a segmental ring between said cap and said nut segments, a plurality of bearing balls between the cap and the segmental ring, said segmental ring comprising at least as many segments as there are nut segments, adjacent ring segments being freely movable circumferentially with reference to each other, and wedging means associated with each nut segment to enter between adjacent ring segments for separating them by an advance of the nut segments.

8. A nut and screw feeding device comprising, in combination, a feed screw, an element to be advanced by rotation of the screw, a plurality of nut-acting members advanced relatively by various parts of the feed screw, and means between said nut-acting members and said element to transmit the average advance of the members to said element.

9. A nut and screw feed device comprising, in combination, a feed screw, an element to be advanced by rotation of the screw, a plurality of nut-acting members positioned to be advanced relatively by adjacent arcuate portions of the screw, and means between said nut acting members and said element to transmit the average advance of the members to said element.

10. A nut and screw feed device, comprising, in combination, a feed screw, an element to be advanced relatively by rotation of the screw, a plurality of members arranged to be advanced simultaneously by different portions of the screw, means interposed between said element and said members to transmit the average advance of the members to the element, said means including a ring composed of circumferentially movable segments which are axially fixed with respect to each other.

11. A nut and screw feed device, comprising, in combination, a feed screw, an element to be advanced relatively by rotation of the screw, a plurality of members arranged to be advanced simultaneously by different portions of the screw, means interposed between said element and said members to transmit the average advance of the members to the element, said means including a ring composed of circumferentially movable segments which are axially fixed with respect to each other, and means moved by the members entering between adjacent segments of the ring to effect a separation thereof by the advance of a member.

12. In a device of the character described, an averaging mechanism comprising, in combination, an abutment member, a ring acting against said member composed of a plurality of segments movable circumferentially with respect to each other and wedging means acting between said segments, and movable members bearing against said wedging means.

13. In a device of the character described, an averaging mechanism comprising, in combination, an abutment member, a ring acting against said member composed of a plurality of segments movable circumferentially with respect to each other, a plurality of bearing balls between said member and said segments, retaining means on each segment to retain a fixed number of balls always in association with each segment, and wedging means entering between the adjacent segments, and movable members bearing against said wedging means.

14. In a device of the character described, a correcting nut comprising, in combination, a container having a cylindrical recess therein, a plurality of longitudinal nut segments therein, a key way in the container for each segment, a key on each segment slidable in a key way whereby to hold the segments axially movable and circumferentially immovable, a cap secured over the end of the casing, and an averaging mechanism acting on the cap and acted upon by the segments whereby to move the container with a motion which is the average of the motion of the segments.

15. In a device of the character described, a correcting nut comprising, in combination, a container having a recess therein, a plurality of longitudinal arcuate nut segments in said recess, guiding means disposed between each segment and the container whereby to hold the segments axially movable and circumferentially immovable with respect to each other, capping means over the end of said container and rigidly secured thereto, and an averaging mechanism acting on the capping means and acted upon by the segments whereby to move the container with a motion which is the average of the motion of the segments.

16. A correcting device for inaccuracies of feed screws comprising, in combination, a plurality of members arranged to be advanced independently by a feed screw, and means affected by each of said members to average the advance of all of said members.

17. A correcting device for the inaccuracies of feed screws comprising, in combination, a plurality of nut sections arranged to be acted upon by the feed screw, an element to be advanced by all of said nut sections, and means between said element and each of said sections to average the advance of the sections.

18. A correcting device for the inaccuracies of feed screws comprising, in combination, a nut formed of a plurality of sections longitudinally movable relative to each other axially of the nut, and mechanism associated therewith to average the separate advances of the nut sections.

In testimony whereof, I have hereunto affixed my signature.

STAFFORD M. RANSOME.